Figure 1:
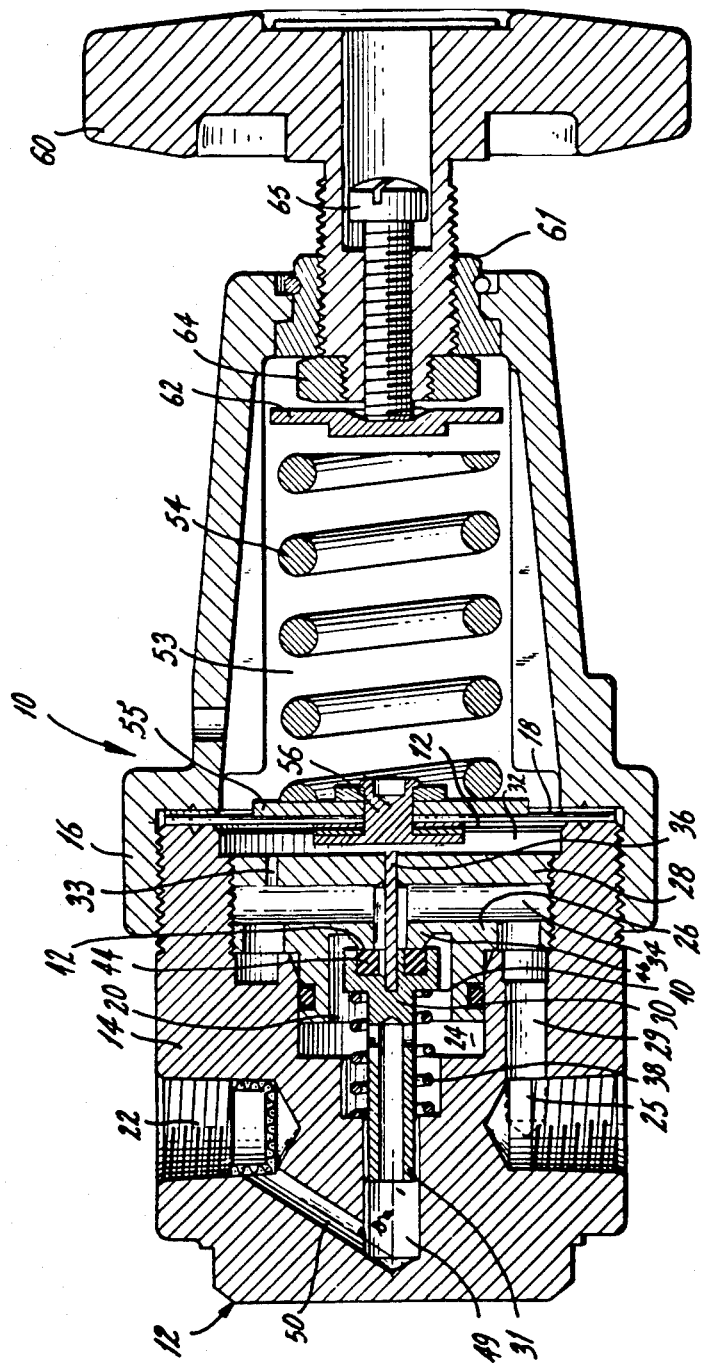

United States Patent [19]

Acomb et al.

[11] Patent Number: 4,489,751

[45] Date of Patent: Dec. 25, 1984

[54] PRESSURE REDUCING REGULATOR FOR OXYGEN SERVICE

[75] Inventors: Byron H. Acomb, Florence; Frank J. Gusky, Quimby, both of S.C.

[73] Assignee: Union Carbide Corporation, Danbury, Conn.

[21] Appl. No.: 456,444

[22] Filed: Jan. 7, 1983

[51] Int. Cl.³ .............................................. F16K 31/12
[52] U.S. Cl. ........................... 137/505.36; 137/484.8; 137/505.26; 137/505.37; 137/505.42
[58] Field of Search ........... 137/484.8, 505.26, 505.36, 137/505.37, 505.34, 505.35, 505.42

[56] References Cited

U.S. PATENT DOCUMENTS

| | | | |
|---|---|---|---|
| 1,891,547 | 12/1932 | Krichbaum | 137/505.26 X |
| 2,208,261 | 7/1940 | Jackson | 137/505.35 X |
| 2,287,992 | 6/1942 | Grove | 137/505.37 |
| 2,358,819 | 9/1944 | Morris | 137/484.8 |
| 2,625,954 | 1/1953 | Klein | 137/505.42 X |
| 3,812,877 | 5/1974 | Fleischhacker | 137/505.42 |

*Primary Examiner*—Harold W. Weakley
*Attorney, Agent, or Firm*—Eugene Lieberstein

[57] ABSTRACT

The pressure reducing regulator of the present invention is designed for oxygen service to prevent oxygen burn through. The regulator includes a diaphragm assembly which uses a metallic shield to protect the diaphragm from hot gases or combustibles issuing from valve chamber upstream of the diaphragm chamber.

4 Claims, 2 Drawing Figures

PRESSURE REDUCING REGULATOR FOR OXYGEN SERVICE

This invention relates to gas pressure reducing regulators and more particularly to an improved diaphragm regulator design for oxygen service which substantially reduces the susceptibility of the regulator to oxygen burnout.

Fluid pressure reducing regulators for converting an inlet gas such as oxygen supplied from an external variable pressure source at relatively high pressure to a constant relatively low delivery pressure have been in commercial use for a substantial number of years. Through out each year reports of pressure regulator oxygen burnout are received. When oxygen burnout does occur the damage is frequently so extensive that the potential for serious operator injury from a burn through the regulator housing is very high and represents an operational hazard. Conditions contributing to ignition of the valve seat and/or other downstream elements include; for example, an accelerated rise in temperature attributable to the heat of compression, a chemical reaction from the presence of hydrocarbons, friction from high velocity gas or from moving foreign particles, sparks, etc. Once ignition starts it quickly spreads to and consumes the flexible diaphragm. When the diaphragm ignites, the burning gases and molten material can erupt with near explosive violence. Although the potential of oxygen burnout is present in all commercially available regulators, no solution has heretofore been found to eliminate or minimize the likelihood of injury from a burnout.

The regulator design of the present invention is an improvement over the diaphragm regulator described in Applicant's pending U.S. patent application Ser. No. 386,999 the teaching of which is incorporated herein by reference. The regulator design of the present invention provides an even further increase in safety by protecting the diaphragm from any hot gases and combustibles issuing from the valve assembly following an ignition. The diaphragm is protected for a time sufficient to permit the burnout to quench itself before igniting the diaphragm. The products of combustion if contained within the regulator housing are frequently sufficient to extinguish the fire.

In general, the pressure regulator design of the present invention comprises a regulator body having an inlet opening adapted to be connected to a source of high pressure oxygen; an outlet opening for discharging the oxygen at a controlled reduced pressure; a valve chamber having an upstream and downstream end relative to the flow of the oxygen; a valve assembly disposed within the valve chamber and including a slidable valve member containing a valve seat disposed at the downstream end of the valve chamber, a valve stem and a nozzle; a control chamber located in the nozzle; a bonnet having a bonnet chamber; a diaphragm assembly having a flexible diaphragm for forming a diaphragm chamber between the bonnet chamber and the nozzle and a metallic shield disposed in the diaphragm chamber adjacent the diaphragm; and bleed passages for controllably coupling the diaphragm chamber to the control chamber whereby the metallic shield substantially blocks the diaphragm from any hot gases or combustibles issuing from the bleed passages in response to an ignition in the regulator body upstream of the diaphragm chamber.

Figure 2:
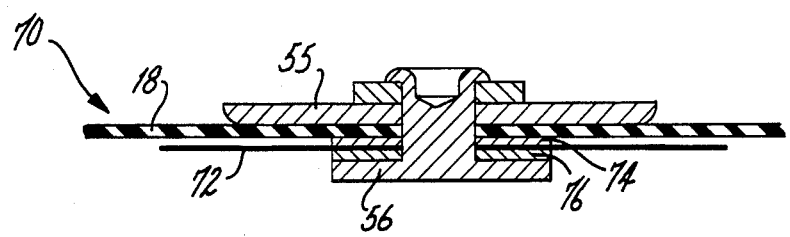

Other features and advantages of the pressure regulator design of the present invention will become apparent from the following detailed description of the invention when read in conjunction with the accompanying Figures of which:

FIG. 1 is a sectional view in side elevation of the gas pressure reducing regulator of the present invention and FIG. 2 is a sectional view in side elevation of the diaphragm assembly in the gas pressure reducing regulator of FIG. 1.

Referring now in particular to FIG. 1, the single stage pressure regulator 10 of the present invention has a hollow body 12 with a thick outer casing wall 14 threadably fitted into a bonnet 16. A flexible diaphragm 18 is securely clamped between the casing wall 14 and the bonnet 16. A regulator valve generally depicted as 20 is mounted within the body 12 of the regulator 10. The body 12 had an inlet 22 for supplying gas at high pressure from a source (not shown) to a valve chamber 24 and an outlet 25 for supplying regulated gas at low pressure.

The regulator valve 20 comprises a nozzle 26 having a head 28 threadably engaged to the wall 14 of body 12 and a slidable valve member 30 disposed within the valve chamber 24. The head 28 of the nozzle 26 is spaced from the diaphragm 18 to form a diaphragm chamber 32. A drilled passageway 34 in the nozzle 26 defines a low pressure control chamber which communicates with the diaphragm chamber 32 through one or more bleeder holes 33 in the nozzle 26. The low pressure control chamber 34 also communicates with the outlet connection 25 through another passageway 29 in the nozzle 26.

The valve member 30 has an extended cylindrical section 31 slidably mounted within a bore 49 of the casing wall 14 and has a valve stem or push pin 36 extending through the nozzle 26 into the diaphragm chamber 32. A compression spring 38 surrounds the valve section 31 and bears against a shoulder 40 for urging the valve member 30 into abutting relation with an extended portion 46 of the nozzle 26. The shoulder 40 has a cylindrical recess 42 in which a valve seat 44 is molded. The valve seat 44 is composed of a elastomer material having a high resistance to combustion. The valve seat 44 is biased by the spring 38 against the extended portion 46 of the nozzle of 26 for keeping the regulator valve 20 normally closed. The extended portion 46 has a frusto-conical geometry with its tapered side in alignment with the edge of the recess 42 such that upon loss of valve seat material the tapered side nestles into the recess 42 to seal off the regulator valve 20.

The gas inlet 22 is connected to the valve chamber 24 through two inlet passageways 50 and 49 respectively. The longitudinal axes of the inlet passageway 5 and 49 intersect to form an included angle of less than ninety (90) degrees. Although more than two passageways may be used at least two are preferred to form a tortuous path requiring the inlet gas to make at least one sharp turn of more than ninety (90) degrees before entering the valve chamber 24 and contacting the valve seat 44. It is postulated that a regulator having such an incoming gas travel path will not experience a degree of temperature rise at the valve seat necessary to cause ignition through adiabatic compression.

The diaphragm 18 is part of a diaphragm assembly 70 fastened together by a rivet 56. The diaphragm 18 may be formed of any flexible material preferably of a nonmetallic composition such as rubber. The diaphragm assembly 70, as is more clearly shown in FIG. 2, includes the diaphragm 18, a flat pressure plate 55 on the nonregulated side of the diaphragm 18 and a thin flat disk-like flexible metallic shield 72 on the regulated side of the diaphragm 18. The metallic shield 72 is preferably suspended between two gaskets 74 and 76 respectively. The metallic shield 72 may be composed of any metal such as brass, copper or stainless steel and need only be, for example, 0.004 inches thick. The metallic shield 72 should be disposed in the diaphragm chamber 32 in a plane substantially parallel to the diaphragm 18 and have a diameter or length extending at least beyond the bleeder holes 33 in the nozzle 26 and up to substantially the inside dimension of the casing wall 14. Accordingly, the diaphragm 18 will be protected from any burning materials issuing from he bleeder holes 33 following an ignition by the blocking action of the metallic shield 72. The flexibility and thinness of the shield does not disturb the regulating function of the regulator 10.

The bonnet 16 forms a bonnet chamber 53 containing a loading spring 54 disposed between the pressure plate 55 in the diaphragm assembly 70 and a support plate 62. A manually adjustable pressure adjusting screw 60 is threaded through a bushing 61. A lock nut 64 prevents the adjusting screw 60 from being removed from the bonnet chamber 53. A trim screw 65 is threadably connected to the pressure adjusting screw 60 and contacts the support plate 62. The trim screw 53 provides a vernier adjustment after the pressure adjusting screw 60 is rotated full in to establish the desired maximum delivery pressure. The spring 54 applies a downward pressure upon the plate 55 to move the diaphragm assembly 70 into contact with the valve stem 36. When this pressure is sufficient to overcome the forces acting on the shoulder 40 of the valve member 30, the valve member 30 is slidably adjusted along the longitudinal axis of the regulator into an open valve position to admit gas into the low pressure control chamber 34 and in turn through the bleeder holes 33 into the diaphragm chamber 32. The diaphragm assembly 70 stabilizes the forces on the valve stem 36 tending to maintain equilibrium. The separation of the diaphragm chamber 32 from the low pressure chamber 34 by means of the nozzle head 28 provides a damping action in the operation of the regulator and tends to isolate the diaphragm 18 from direct contact with in rushing gas through the valve 20 which also minimizes the potential of oxygen burnout.

I claim:

1. In a pressure regulator for regulating the flow of oxygen supplied to the regulator from a source of oxygen at a high inlet gas pressure comprising: a regulator body having an inlet opening adapted to be connected to said source of high pressure oxygen; an oulet opening for discharging the oxygen at a controlled reduced pressure; a valve chamber having an upstream and downstream end relative to said flow of the oxygen; a valve assembly disposed within the valve chamber and including a slidable valve member containing a valve seat disposed at the downstream end of the valve chamber, a valve stem and a nozzle; a control chamber located in the nozzle; a bonnet having a bonnet chamber; and a diaphragm assembly having a flexible diaphragm for forming a diaphragm chamber between the bonnet chamber and the nozzle and bleed passages for controllably coupling the diaphragm chamber to the control chamber the improvement comprising: a disk like metallic shield suspended from the diaphragm in the diaphragm chamber and in close proximity to the diaphragm, said metallic shield being very thin and flexible so as not to disturb the regulating function of the regulator and having a relatively large diameter covering a substantial proportion of the diaphragm in the diaphragm chamber so as to isolate and protect the diaphragm from any hot gases or combustibles issuing from the bleed passages in response to an ignition in the regulator.

2. In a pressure regulator as defined in claim 1 wherein said metallic shield lies in a plane substantially parallel to said diaphragm with its diameter extending at least beyond said bleed passages.

3. In a pressure regulator as defined in claim 2 wherein said metallic shield is composed of a material selected from the group consisting of brass, copper and stainless steel.

4. In a pressure regulator as defined in claim 3 wherein said shield is separated from said diaphragm by a gasket.

* * * * *